United States Patent [19]

Fitchmun

[11] Patent Number: 4,778,717
[45] Date of Patent: Oct. 18, 1988

[54] THERMOPLASTIC THERMOFORMABLE COMPOSITE MATERIAL

[75] Inventor: Douglas R. Fitchmun, Woodland Hills, Calif.

[73] Assignee: Medical Materials Corporation, Westlake Village, Calif.

[21] Appl. No.: 886,543

[22] Filed: Jul. 16, 1986

[51] Int. Cl.$^4$ .............................................. B32B 7/00
[52] U.S. Cl. ................................... 428/246; 428/247; 428/251; 428/252; 428/286; 428/287
[58] Field of Search ............... 428/246, 247, 251, 252, 428/286, 287

[56] References Cited

PUBLICATIONS

"A New Ankle Foot Orthosis with a Moldable Carbon Composite Insert", Carlton Fillauer, Orthotics and Prosthetic, vol. 35, No. 3, pp. 13–16, Sep. 1981.
Handbook of Composites, George Lubin, 1982, pp. 740,741.
Plexiglas Dr Rigidizing Manual, Jack Hough, Rohm and Haas Co., pp. 1–63.

Primary Examiner—Marion C. McCamish
Attorney, Agent, or Firm—Ellsworth R. Roston; Charles H. Schwartz

[57] ABSTRACT

A thermoplastic composite having a plurality of layers of material each having a particular total thickness and a particular total volume, including a first layer of thermoplastic resin materal forming a core. At least two layers of fabric material each disposed on an opposite side of the first layer and impregnated with the core material to define an outer skin on the core. Two layers of thermoplastic resin material each overlaying one of the at least two layers of fabric and each bonded to the thermoplastic material impregnated in the adjacent layer of fabric material to define an outer covering for protecting the layers of fabric and providing a covering for protecting the layers of fabric and providing a smooth exterior. The thickness of the core forming a substantial percentage of the total thickness of the composite and the fiber volume of the at least two layers of fabric material forming less than one third (⅓) of the total volume of the composite.

30 Claims, 2 Drawing Sheets

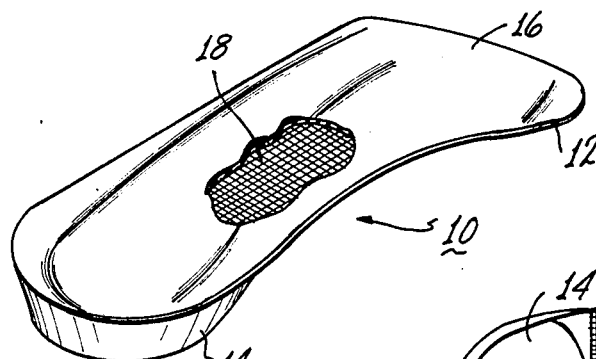
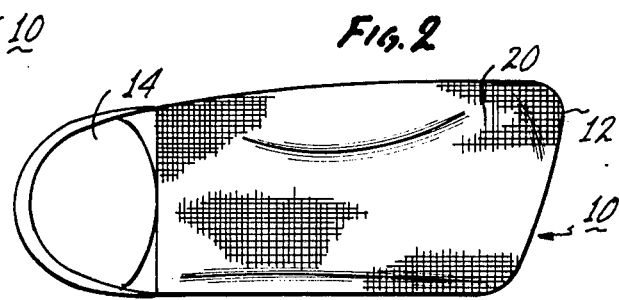
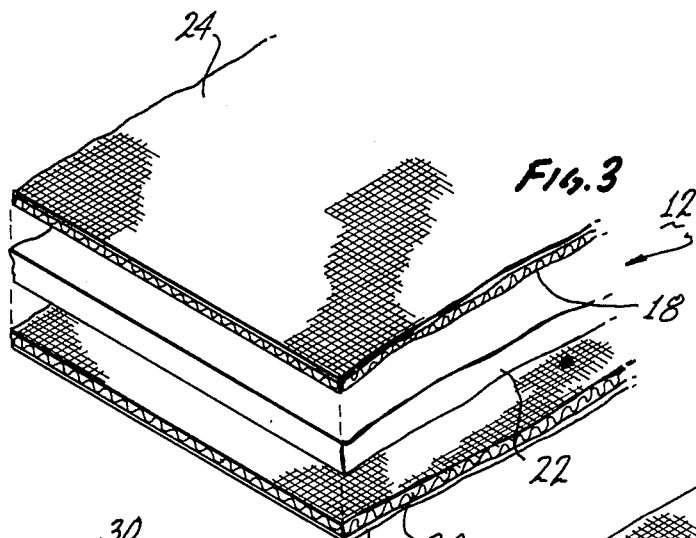
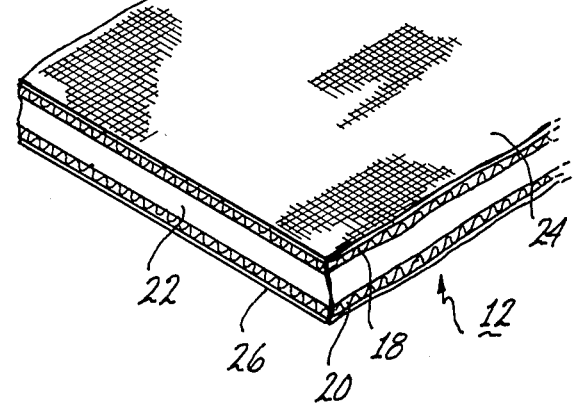
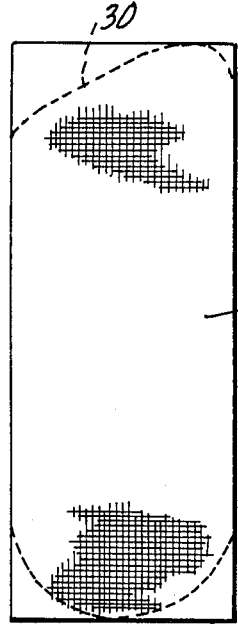

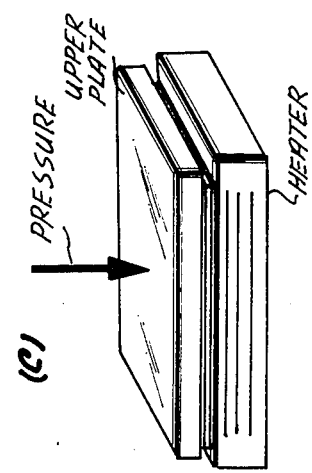
Fig. 8
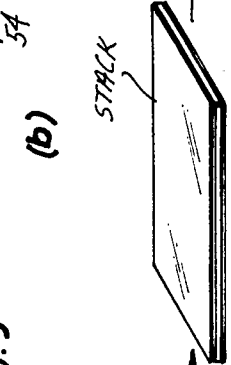
(c)
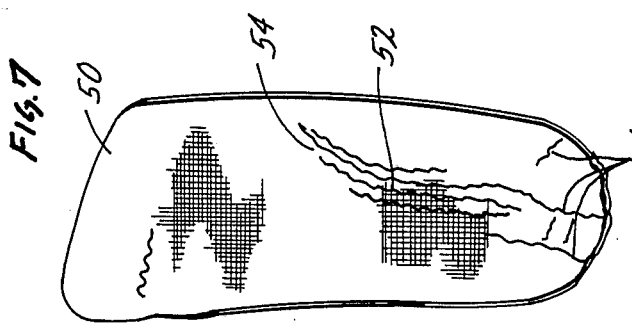
Fig. 7
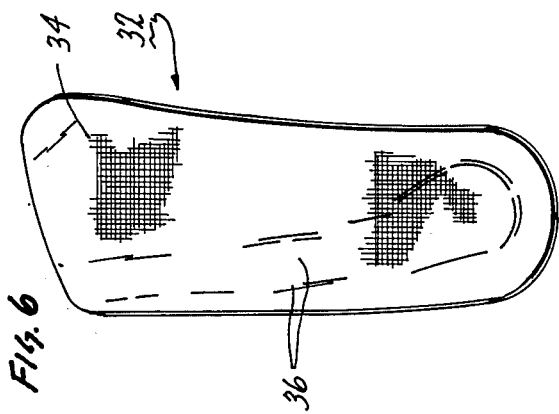
Fig. 6
(b)
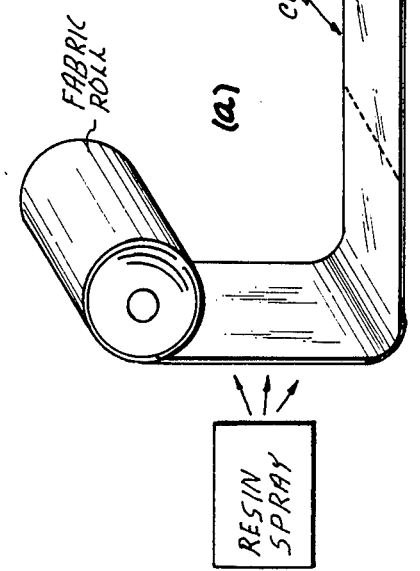
Fig. 9
(a)

THERMOPLASTIC THERMOFORMABLE COMPOSITE MATERIAL

BACKGROUND OF THE INVENTION

1. Field of the Invention

The present invention relates to a thermoplastic composite material. Specifically the invention relates to a thermoplastic composite material which may be manufactured in sheet or panel form and with the composite material later thermoformed into a complex shape having complex contours. In particular, the complex shape may be used for various industrial or medical purposes and one such specific example is an orthotic insert for use within foot gear.

2. Description of Prior Art

It is often desirable to form a sheet of plastic material into a complex shape. One method of accomplishing this is to provide for a mold having the desired complex shape and to thermoform the plastic sheet into the complex shape. The thermoforming is typically accomplished through the use of heat and pressure, such as vacuum forming, to conform the plastic sheet to the complex shape. In this type of structure, the plastic sheet would be a thermoplastic material which may be manufactured and sold in sheet form and with a subsequent forming into the complex shape as described above.

As an example, orthotic inserts are currently made using a sheet of acrylic material. The sheet of acrylic material may be cut into a desirable shape and then molded under heat and vacuum to conform to the shape of a casting made in representation of the bottom of a foot. Other thermoplastic materials may be used in substitution to acrylics such as polypropylenes and polyethylenes. The difficulty with all of these materials for use in structures such as orthotics is that, in order to provide the proper level of rigidity necessary to properly serve as an orthotic, these prior art materials are generally quite thick and as an example may vary between 120 to 200 thousandths of an inch. Unfortunately, such thick materials are heavy and are generally too thick to slip into the foot gear already owned. This requires the purchase of larger foot gear to accommodate these prior art orthotic inserts. In addition, the prior art materials are not only thick, but are not as durable and resistant to breaking as would be desirable.

As an alternative to the prior art thermoplastic materials, thermoset laminate constructions have been used to provide for complex shapes such as orthotic inserts. As an example, reference is made to prior U.S. Pat. No. 4,439,934 issued Apr. 3, 1984, for an orthotic insert. In this patent an insert is formed by a cumbersome technique of laying upon a positive cast a series of layers of various material. These layers may include layers of cloth impregnated with thermoset resin and layers of graphite and with these individual layers thermoset to the desired shape under heat. If the cast is not perfectly accurate, then the insert cannot be adjusted since it has been thermoset (cured) to a specific structural form.

The use of the thermoset process, therefore, means that the orthotic insert must be manufactured to the exact shape the first time since the thermoset process does not allow for any post forming at a later time in the field. This limitation has, therefore, greatly restricted the use of such thermoset laminate constructions as shown in the above referenced patent. It is much more desirable for the person prescribing the orthotic insert to be able to post form the insert to make adjustments to the orthotic insert. This is acomplished through the use of localized heating to make changes in the complex shape of the insert without in turn destroying the structure or integrity of the insert. For these reasons, thermoplastic orthotic inserts have received far greater acceptance in the orthotic field even with the various limitations described above.

It can be seen that a proper combination of features is not available in the prior art. In general the prior art acrylic material is relatively easy to fabricate and is post formable, but this material is typically quite thick, such as 120 to 180 thousandths of an inch and is both brittle and heavy. Other prior art materials such as polypropylene are also quite thick, such as 160 to 200 thousandths of an inch, but this material is more difficult to fabricate than acrylic and is more difficult to post form. The polypropylene material is heavy, but it is not brittle. The thermoset laminate described above can be quite thin, such as 65 to 80 thousandths of an inch. However, the fabrication of the thermoset sandwich is difficult and generally requires special processing and once formed is not post formable. The formed thermoset material is not brittle, but even though the material is quite thin it is heavy.

Because of the above described problems with the thermoset laminate construction, complex shapes, such as orthotic inserts, are generally formed using thermoplastic materials, such as acrylic and polypropylene. In particular the inserts are made by first making a plaster mold from the patient's foot. This plaster mold forms a negative image of the bottom of the foot. A positive mold is then made from the negative plaster casting and thermoplastic sheet material is thermoformed using heat and vacuum to conform to the positive mold to make the appropriate insert. As indicated above, thermoplastic material has the great advantage in that it is post formable so that the orthotic insert may be heat adjusted at a later time to correct any minor misfit. This is important since it eliminates the necessity of making a new insert as would be necessary with a thermoset laminate constuction.

SUMMARY OF THE INVENTION

The present invention provides for a thermoplastic composite material which overcomes the various difficulties provided by prior art thermoplastic materials and thermoset laminate instructions. Specifically, the thermoplastic composite material of the present invention is relatively thin, such as 55 to 85 thousandths of an inch, is lightweight yet is strong and not brittle. The thermoplastic composite material is easily fabricated into complex shapes such as an orthotic insert and is post formable so that adjustments to the complex shape may be made at a later time.

The above advantages of the present invention are provided by a thermoplastic construction which is a composite and includes a core of a thermoplastic material such as an acrylic and with outside layers of a fabric made from fibers such as carbon fiber, glass fiber, aramid fiber or combinations thereof. The composite construction of the present invention is significantly different than prior art laminate structures in that the fabric layers are located adjacent to the outer surfaces of the composite and with the fiber volume of the fabric layers representing a much smaller fraction of the total volume of the composite than with prior art sandwich constructions. The fabric layers may be woven, unidirectional fibers or chopped or continuous random strand matts or combinations thereof. The direction of the fabric layer may be varied depending upon the desired physical characteristics.

In addition, the core material and other resins used in the construction are thermoplastic materials rather than the thermoset materials of the prior art used in laminate constructions. As an example, if the sheet of composite material of the present invention has a particular total volume, then the fiber volume for the fabric layers represents a maximum of one third ($\frac{1}{3}$) of this total volume. The range for the fiber volume for the fabric layers relative to the total volume of the composite may be between 5% to 33 $\frac{1}{3}$%, but with the preferred range between 8 to 25%. This is in contrast to the prior art thermoset laminate constructions where the fiber volume of the fabric layers represent more than 50% of the total volume of the laminate construction. As a specific example, a laminate construction using glass fiber fabric typically has the fiber volume of the glass fabric representing 52% to 55% for the total volume of the laminate. If the thermoset laminate uses carbon fabric layers, the fiber volume of the carbon fabric typically represents 55% to 62% of the total volume. As described in the present application, the term fiber volume refers to the volume provided by the sum of the volumes displaced by each individual fiber in the fabric layer. The total volume refers to the overall volume displaced by the composite.

The present invention, therefore, provides for a low percentage of the fiber volume for the fabric layers relative to the total volume and also provides for a specific location of these fabric layers adjacent to the outer surfaces of the sheet of composite material. The location is important since the location maximizes the rigidity of the composite structure when formed to the desired shape. In addition, the relatively large thickness for the core of thermoplastic material between the two fabric layers allows the two layers to move independently of each other during thermoforming. This independent freedom of movement provides for the layers of fabric to conform to the desired complex shape without severe wrinkling or delamination and without any significant buckling of the formed composite material.

If a standard laminate construction were used, or if a higher fiber volume for the fabric layers relative to the total volume were used, the complex shape could not be accomplished without severe wrinkling or delamination and in the extreme case without buckling. As an example, if the composite material of the present invention were constructed with thicker layers of fabric or additional numbers of layers, so that the fiber volume for the fabric layers was more than one third ($\frac{1}{3}$) of the total volume, then the molded product would have undesirable characteristics such as severe wrinkling and buckling. This does not mean that a composite material constructed in accordance with the teachings of the present invention cannot be made with more than two layers, but rather that the maximum fiber volume of the fabric layers relative to the total volume cannot be more than one third ($\frac{1}{3}$).

The present invention, therefore, provides for a thermoplastic composite including a core of thermoplastic material and at least two outer layers, adjacent the outside surfaces of the core, to provide for a sheet material which may be thermoformed into a complex shape. The thermoformed shape may be further post formed in order to provide for adjustments to the complex shape. The composite of the present invention is thin, lightweight, rigid and not brittle and is very easy to fabricate.

BRIEF DESCRIPTION OF THE DRAWING

A clearer understanding of the present invention will be had with reference to the following description and drawings wherein:

FIG. 1 is a perspective view of a completed orthotic insert constructed in accordance with the teachings of the present invention;

FIG. 2 is a bottom view of the orthotic insert of FIG. 1;

FIG. 3 is an exploded view of the various materials used to form the thermoplastic composite of the present invention;

FIG. 4 is a cross-sectional view of the thermoplastic composite of the present invention in sheet form and prior to forming into a complex shape;

FIG. 5 illustrates a portion of the sheet material of FIG. 4 trimmed to a desired configuration, but prior to forming into the complex shape shown in FIGS. 1 and 2;

FIG. 6 illustrates the forming of the sheet material of FIG. 5 into the complex shape, but prior to the other steps to produce the completed orthotic insert of FIGS. 1 and 2;

FIGS. 7 and 8 illustrate two sides of a composite material after forming and showing the effects of using fabric layers having a maximum fiber volume representing more than one third ($\frac{1}{3}$) of the total volume; and FIG. 9 illustrates a method of making the thermoplastic composite.

DESCRIPTION OF THE PREFERRED EMBODIMENT

FIGS. 1 and 2 illustrate a completed othotic insert 10 formed by a thermoplastic composite of the present invention. It should be appreciated that the disclosure of the present invention uses an orthotic insert as an example and that the thermoplastic composite of the present invention may also be used for a wide variety of products in the medical and industrial fields.

The orthotic insert 10 is formed by a base member 12 molded from the thermoplastic composite of the present invention. A heel portion 14 is attached to the base member 12 and a soft durable covering material 16 covers the base member 12. The covering material may be of any suitable leather-like material to provide for a comfortable surface adjacent the foot of the user of the orthotic insert. The heel portion 14 may be molded from a rigid plastic material to operate as a heel support within the footgear. Both the heel portion 14 and the covering material 16 are known in the prior art and form no part of the present invention.

FIG. 1 also illustrates that the base member 12 formed by the composite has a complex shape conforming to the bottom surface of the foot of the user of the orthotic insert and with each such complex structure tailor made for a particular user. In general the provision of such orthotic inserts is by medical personnel who specialize in fitting such inserts to a user to provide the proper support to the user during various activities. Typically plaster molds of the user's feet are made and these molds are sent to a laboratory. The laboratory in turn makes castings from the mold which casting thereby represent the bottoms of the user's feet. Orthotic inserts are then formed to provide for the proper inserts conforming to the bottoms of the user's feet. The laboratory supplies a finished product, but it is important that this finished product be post formable so that adjustments can be made in the field if there are any problems with the inserts. The base member 12 of composite material of the present invention does allow for such post forming.

As can be seen in FIGS. 1 and 2, the base member 12 is a composite and includes layers of woven fabric 18 and 20 which are visible at the exterior surfaces of the base member. In particular the composite structure of the base member 12 is formed of a number of layers. As shown in FIG. 3 the layers include a central core 22 which represents the thickest portion of the composite structure for the base member 12. Disposed on, and bonded to, the thermoplastic material of the core member 22 are the thermoplastic material impregnating the layers of woven fabric material 18 and 20. Thin layers of thermoplastic material 24 and 26 are disposed on, and bonded to, the thermoplastic material impregnating. The thermoplastic composite 12 defined by the core 20, the layers of thermoplastic material 22 and 24 and the layers of woven fabric 18 and 20 impregnated with the thermoplastic material is formed into a sheet as shown in FIG. 4.

The actual production of the thermoplastic composite is shown in FIG. 9 and in the first step (a) the layers of woven fabric 18 and 20 are impregnated with a thermoplastic material such as an acrylic prepolymer. The fabric may be formed of carbon fibers, glass fibers or aramid fibers or combinations thereof. Typically the impregnated fabric layers may be then rolled between carrier films for storage. It is to be appreciated that, although the preferred structure for the fabric layer is woven, the fabric layer may also be formed of unidirectional fiber or chopped or continuous random strand matts. The actual composite sheet 12 is then formed as shown in step (b) by stacking a layer of impregnated fabric, a layer of the core such as a core of acrylic material and then a layer of impregnated fabric. As shown in step (c) the structure is then heated under pressure to form the composite 12 shown in FIG. 4.

It is to be appreciated that the above method of formation of the composite 12 is illustrative only and other methods may be used. For example, the composite may be formed using a continuous cast techique so that all of the materials are formed together at the same time using separate layers of thermoplastic material, such as acrylic, and separate fabric layers such as carbon, glass or aramid fabric. Also, the particular orientation of the direction of the weave may be varied to adjust the rigidity of the composite.

A significant factor in the formation of the composite is the large thickness of the core layer 22 relative to the fabric layers 18 and 20 and the location of the fabric layers substantially adjacent the outer surfaces of the core layer 22. As a specific example, in the completed thermoplastic composite sheet of FIG. 4, the total thickness may be approximately 70 thousandths of an inch. Each of the fabric layers 18 and 20 may have a thickness of approximately 8 to 9 thousandths of an inch in the completed composite. The outer layers 24 and 26 of thermoplastic material may be quite thin such as 0.75 to 1.5 thousands of an inch.

It can be seen, therefore, that the thermoplastic portion represents the majority of the volume of the composite sheet. Specifically, since the fabric layers 18 and 20 are woven and since the thin exterior layers 24 and 26 are bonded to the thermoplastic material impregnating the layers 18 and 20, the actual fiber volume for the fabric layers 18 and 20 represents approximately 13% of the total volume of the composite.

When the fiber volume represents such a small percentage, then the composite may be molded into complex forms without creating any severe wrinkling or buckling of the molded sheet. However, the use of the fabric layers 18 and 20 greatly increases the stiffness and rigidity of the composite relative to a sheet formed only of thermoplastic material. On the other hand, the location of the fabric layers and the relatively large amount of thermoplastic material in the core intermediate the fabric layers allows the layers to move independently of each other during forming so that the layers can adjust to the desired shape.

Prior art thermoset laminate constructions typically used a large number of fabric layers located relatively close to each other, and if such a structure were used even with a thermoplastic material, the structure could not be formed to the desired complex shapes. This is why such prior art laminate constructions are typically formed as a thermoset sandwich where the layers are built up one at a time to individually conform to the desired shape before being thermoset.

Although the described embodiment of a composite has a fiber volume for the layers 18 and 20 of approximately 13% relative to the total volume, the actual range of fiber volume relative to the total volume may be between 5% and 33 ⅓% and with a preferred range of 8% to 25%. At the lower percentages the stiffness and rigidity of the composite sheet is reduced while allowing for maximum forming capability. At the higher percentages the stiffness and rigidity are increased while reducing the possible formation capability. The specific embodiment described above provides for the desired rigidity and degree of formation necessary to provide a superior orthotic insert of the type shown in FIGS. 1 and 2.

FIGS. 5 and 6 illustrate the methods of manufacture of the orthotic insert of FIGS. 1 and 2. Specifically in FIG. 5 the large panels of composite formed by the method of FIG. 9 may be cut into composite sheets 12 having a flat rectangular form. As shown by the dotted line 30, the rectangular form is cut out to represent an orthotic blank 32. This may actually be the blank that would be supplied to the laboratory forming specific orthotic inserts.

In particular as shown in FIG. 6, the blank 32 may then be molded by heat and vacuum to conform to the bottom of the foot of a specific user. This is shown by the molded form 34. During the molding the layers of fabric 18 and 20 move to adjust to the complex shape representing the bottom of a foot. Since the fabric layers can move independently of each other, there may only be minor rippling as shown by rippling 36. The rippling represents portions of the fabric being pushed towards each other so that the outer surface of the composite is slightly raised. This rippling 36 is minor and will ultimately be covered by the layer of material 16 shown in FIG. 1.

The molded blank 34 of FIG. 6 is then turned into a complete orthotic insert by grinding away the outer edge to the specific desired shape and then polishing the edge. A heel member 14 is added either before or after the polishing and finally the inner surface of the insert is covered with the layer of material 16. This is shown in FIGS. 1 and 2. The completed structure thereby provides the desired rigidity and strength characteristics, but with a much thinner insert than prior art thermoplastic inserts. In addition, the insert of the present invention is post formable so that adjustments may be made to the insert even after the manufacture of the insert in the laboratory.

FIGS. 7 and 8 represent a molded blank 50 similar to the molded blank 34, but with the fabric layers representing a much higher fiber volume relative to the total volume of the composite material. For example, in the structure of FIGS. 7 and 8 the fiber volume is greater than one third ($\frac{1}{3}$) of the total volume and may actually represent over 50% of the total volume. This is the typical fiber volume for thermoset sandwich constructions. As shown in FIGS. 7 and 8, the high fiber volume molded blank 50 includes major rippling such as the rippling shown at position 52, but even worse includes buckled portions such as the buckled portions 54 shown on the inside and outside of the molded structure in FIGS. 7 and 8. These buckled portions result from a failure of the fabric material to properly move relative to each other which produces a locking of the sheet material during molding. This locking can only be relieved by severe folds such as the buckled portions 54. Actually if the volume of fiber material is greater than 50% of the total volume then sometimes it is not even possible to produce a molded product since the high amount of fiber material completely resists molding into a desired shape. As will be appreciated, the arrangement shown in FIGS. 7 and 8 does not constitute an embodiment of the invention.

The present invention, therefore, provides for a thermoplastic composite which may be formed into complex structural shapes and produce a resultant structure which is rigid, relatively thin and lightweight. The composite material may be post formed so as to provide for adjustments or corrections in the molded product. Although the invention has been described with reference to a particular embodiment and specifically an orthotic insert, in is to be appreciated that the thermoplastic composite of the present invention may have other industrial or medical uses. The invention, therefore, is only to be limited by the appended claims.

I claim:

1. A thermoplastic thermoformable composite sheet having a particular thickness and a particular volume for shaping into a complex form without rippling or buckling, including, a core of a thermoplastic material formed as a sheet, and two layers of a fabric material respectively positioned at opposite sides of the core of the thermoplastic material and impregnated with the thermoplastic material, the impregnated thermoplastic material being bonded to the thermoplastic material in the core, the fiber volume of the at least two layers of fabric material representing less than one third ($\frac{1}{3}$) of the particular volume of the composite sheet, the layers of the fabric material being provided with a thickness sufficient to produce a stiffness and rigidity of the thermoplastic thermoformed composite sheet and the core of the thermoplastic material being provided with a thickness to provide for a movement of the layers of the sheet independently of one another during shaping of the sheet into the complex form without rippling or buckling of the layers.

2. The thermoplastic thermoformable composite sheet of claim 1, wherein the core is formed of an acrylic material.

3. The thermoplastic thermoformable composite sheet of claim 1, wherein the two layers of the fabric material are made of fibers selected from the group consisting of carbon, glass and aramid.

4. The thermoplastic thermoformable composite sheet of claim 3 wherein the at least two layers the fabric material are selected from the group consisting of woven threads, unidirectional fibers and random strand mats.

5. The thermoplastic thermoformable composite sheet of claim 1, wherein the two layers of the fabric material are woven.

6. The thermoplastic thermoformable composite sheet of claim 1, wherein the fiber volume of the at least two layers of fabric material is within a range of five (5) to thirty three and one third (33 $\frac{1}{3}$) percent of the particular volume of the composite sheet.

7. The thermoplsatic thermoformable composite sheet of claim 1, wherein the fiber volume of the at least two layers of fabric material is within a range of eight (8) to twenty five (25) percent of the particular volume of the composite.

8. The thermoplastic thermoformable composite sheet of claim 1 wherein the sheet is formed into a complex shape for providing an orthodic insert.

9. A thermoplastic thermoformable composite for shaping into a complex form without rippling or buckling, including a first layer of thermoplastic resin material forming a core, two layers of fabric material each disposed on an opposite side of the first layer and impregnated with the thermoplastic resin material to define an outer skin on the core and bonded to the adjacent surface of the first layer of the thermoplastic plastic material, two layers of thermoplastic resin material each disposed on one of the two layers of fabric material and bonded to the thermoplastic material impregnating the two layers of fabric material to form an outer covering for protecting the layers of the fabric material and for providing a smooth exterior adhered to the overlayed layer of fabric material, and the thickness of the core forming a preponderant percentage of the total thickness of the composite and the fiber volume of the two layers of fabric material forming less than one third ($\frac{1}{3}$) of the total volume of the composite, the two layers of the fabric material being provided with a thickness sufficient to produce a stiffness and rigidity of the thermoplastic thermoformed composite sheet and the first layer of the thermoplastic material being provided with a thickness to provide for a movement of the layers of the sheet independently of one another during shaping of the sheet into the complex form to obtain the desired shaping without rippling or buckling of the layers and the two layers of the thermoplastic resin material being provided with a thickness sufficient to define smooth surfaces over the layers of the fabric material.

10. The thermoplastic thermoformable composite of claim 9, wherein the thermoplastic resin material is an acrylic.

11. The thermoplastic thermoformable composite of claim 9, wherein the two layers of the fabric material are made of fibers selected from the group consisting of carbon, glass and aramid.

12. The thermoplastic thermoformable composite sheet of claim 11, wherein the two layers of the fabric material are selected from the group consisting of woven threads, undirectional and chopped fibers and random strand mats.

13. The thermoplastic thermoformable composite of claim 9, wherein the two layers of the fabric material are woven.

14. The thermoplastic thermoformable composite of claim 9, wherein the fiber volume of the two layers of the fabric material is within a range of five (5) to thirty three and one third (33⅓) percent of the total volume of the composite.

15. The thermoplastic thermoformable composite of claim 9, wherein the fiber volume of the two layers of the fabric material is within a range of eight (8) to twenty five (25) percent of the total volume of the composite.

16. The thermoplastic thermoformable composite of claim 9, shaped into a contoured form defining an orthotic insert.

17. The thermoplastic thermoformable composite of claim 9, wherein the thickness of the two layers of thermoplastic resin bonded to the thermoplastic material impregnating the layers of fabric is relatively small compared to the thickness of the first layer of thermoplastic resin material.

18. The thermoplastic thermoformable composite of claim 17, wherein the impregnated thermoplastic resin and the core resin are acrylic.

19. The thermoplastic thermoformable composition of claim 9 wherein the thickness of the core is considerably greater than the thickness of each of the layers of the fabric material and wherein the thickness of each of the layers of fabric material is conserably greater than the thickness of the two layers of thermoplastic resin material.

20. The thermoplastic thermoformable composite of claim 9, wherein the orthotic insert defines a heel portion and a base portion and wherein a soft and durable material covers the base portion and a member is attached to the heel portion to provide a heel support.

21. A method of forming a thermoplastic thermoformable composite sheet having properties of being shaped into a complex form without rippling or buckling, including the following steps, providing two layers of fabric material, each having a thickness substantially less than the particular thickness of the composite sheet and each impregnated with a thermoplastic material, providing a core of a thermoplastic resin between the two layers of fabric material in a thickness substantially greater than the thickness of the layers of fabric material, and simultaneously applying heat and pressure to the layers of the fabric material and the core to form the layers of the fabric material and the core into a composite sheet in which the volume of the two layers of the fabric material represents less than one third (⅓) of the total volume of the composite sheet and in which the layers of the fabric material are provided with a thickness sufficient to produce a stiffness and rigidity of the composite sheet and the core is provided with a thickness to obtain a movement of the layers of the composite sheet independently of one another during shaping of the sheet into the complex form to obtain such shaping without rippling or buckling of the layers.

22. The method of claim 21 including the additional step of providing two additional layers of thermoplastic resin, the step of forming the layers of the fabric material and the core into the composite sheet also involving the formation of the two additional layers of the thermoplastic resin into the composite sheet, the two additional layers of the thermoplastic material being provided with a thickness sufficient to define smooth surfaces over the layers of the fabric material.

23. The method of claim 22, wherein the two additional layers of the thermoplastic resin are thin compared to the thickness of the thermoplastic material constituting the core.

24. The method of claim 23, wherein the composite sheet is formed by the imposition of heat and simultaneously on the first layer of the thermoplastic resin, the two layers of the fabric material and the two additioanl layers of the thermoplastic resin.

25. The method of claim 24 additionally including the step of molding the composite sheet into an orthotic insert.

26. The method of claim 24 wherein
the fabric material is selected from the group consisting of carbon, glass and aramid and is further selected from the group consisting of woven threads, unidirectional and chopped fibers and random strand mats and wherein
the orthotic insert defines a heel portion and a base portion and wherein a member is attached to the heel portion to provide a heel support and a soft and durable material is attached to the base portion to cushion the base portion.

27. The method set forth in claim 26 wherein
the fabric material is woven and the thermoplastic resin is acrylic.

28. The method of claim 21 additionally including the step of molding the composite sheet into an orthotic insert.

29. The method of claim 21 wherein
the orthotic insert defines a heel portion and a base portion and wherein a member is attached to the heel portion to provide a heel support and a soft and durable material is attached to the base portion to cushion the base portion.

30. The method set forth in claim 21 wherein
the fabric material is selected from the group consisting of carbon, glass and aramid and is further selected from the group consisting of woven threads, unidirectional and chopped fibers and random strand mats.

* * * * *